United States Patent [19]

Salyer

[11] Patent Number: 5,885,475
[45] Date of Patent: *Mar. 23, 1999

[54] PHASE CHANGE MATERIALS INCORPORATED THROUGHOUT THE STRUCTURE OF POLYMER FIBERS

[75] Inventor: Ival O. Salyer, Dayton, Ohio

[73] Assignee: The University of Dayton, Dayton, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 710,871

[22] Filed: Sep. 23, 1996

Related U.S. Application Data

[63] Continuation-in-part of Ser. No. 468,441, Jun. 6, 1995, Pat. No. 5,565,132.

[51] Int. Cl.[6] .............................. C09K 3/18; F28D 17/00
[52] U.S. Cl. ................................ 252/70; 165/10; 165/53; 524/489; 524/490; 524/493
[58] Field of Search ................................ 252/70; 165/10, 165/53; 528/66, 301, 425, 403, 405; 523/222; 524/386, 493

[56] References Cited

U.S. PATENT DOCUMENTS

| | | | |
|---|---|---|---|
| 2,970,986 | 2/1961 | Woodward | 528/301 |
| 3,023,192 | 2/1962 | Shivers | 528/301 |
| 3,044,987 | 7/1962 | Schaefgen et al. | 528/301 |
| 3,310,512 | 3/1967 | Curtice | 528/301 |
| 3,329,557 | 7/1967 | Magat et al. . | |
| 3,337,476 | 8/1967 | Vandenberg | 528/425 |
| 4,111,189 | 9/1978 | Dizon . | |
| 4,259,401 | 3/1981 | Chahroudi et al. . | |
| 4,532,917 | 8/1985 | Taff et al. | 252/70 |
| 4,587,279 | 5/1986 | Salyer et al. | 165/10 |
| 4,708,812 | 11/1987 | Hatfield | 252/70 |
| 4,797,160 | 1/1989 | Salyer . | |
| 4,825,939 | 5/1989 | Salyer et al. | 252/70 |
| 4,851,291 | 7/1989 | Vigo et al. | 428/398 |
| 5,053,444 | 10/1991 | Trotoir . | |
| 5,053,446 | 10/1991 | Salyer . | |
| 5,106,520 | 4/1992 | Salyer . | |
| 5,211,949 | 5/1993 | Salyer | 252/70 |
| 5,282,994 | 2/1994 | Salyer . | |
| 5,454,741 | 10/1995 | Norvell | 206/545 |
| 5,480,928 | 1/1996 | Stratta et al. | 524/386 |
| 5,565,132 | 10/1996 | Salyer . | |

FOREIGN PATENT DOCUMENTS

| | | | |
|---|---|---|---|
| 0 344 014 A3 | 11/1989 | European Pat. Off. . | |
| 481564 | 4/1992 | European Pat. Off. . | |
| 0 747 431 A2 | 12/1996 | European Pat. Off. . | |
| 62-94322 | 4/1987 | Japan | 524/386 |
| 5-59352 | 3/1993 | Japan . | |
| 6-65446 | 3/1994 | Japan . | |
| 6-192646 | 7/1994 | Japan . | |
| 7-48561 | 2/1995 | Japan . | |

*Primary Examiner*—Veronica P. Hoke
*Attorney, Agent, or Firm*—Killworth, Gottman, Hagan & Schaeff, L.L.P.

[57] ABSTRACT

The present invention is directed to a fiber composition comprising a fiber forming polymer and a phase change material integrally incorporated throughout the fiber forming polymer which is either a polyalkylene oxide, polyalkylene ether or mixture of various polyolefins. The phase change material has a melting temperature between about 15° C. and about 65° C. The fiber composition can be used as a loose fill insulating material for use in clothing or bedding articles or can be formed into a fabric for the same uses.

5 Claims, No Drawings

PHASE CHANGE MATERIALS INCORPORATED THROUGHOUT THE STRUCTURE OF POLYMER FIBERS

CONTINUATION DATA

This application is a continuation-in-part of U.S. patent application Ser. No. 08/468,441 entitled "Thermoplastic Moldable, Non-exuding Phase Change Materials," filed Jun. 6, 1995, now U.S. Pat. No. 5,565,132, the disclosure of which is hereby incorporated by reference.

BACKGROUND OF THE INVENTION

The present invention relates to a fiber composition containing a phase change material integrally incorporated into the structure of a fiber forming polymer. The fiber composition is then useful in textile materials, in general, and in clothing, in particular.

Phase change materials may be repeatedly converted between solid and liquid phases to utilize their latent heat of fusion to absorb, store and release heat or cool during such phase conversions. These latent heats of fusion are greater than the sensible heat capacities of the materials. For example, in phase change materials, the amount of energy absorbed upon melting or released upon freezing is much greater than the amount of energy absorbed or released upon increasing or decreasing the temperature of the material over an increment of 10° C.

Upon melting and freezing, a phase change material absorbs and releases substantially more energy per unit weight than a sensible heat storage material that is heated or cooled over the same temperature range. In contrast to a sensible heat storage material which absorbs and releases energy essentially uniformly over a broad temperature range, a phase change material absorbs and releases a large quantity of energy in the vicinity of its melting/freezing point.

Phase change materials have been used in a variety of applications. They have been included in wall and floor boards to store heat to provide a room with a comfortable ambient temperature. They have also been incorporated into cups, glasses and tableware to keep foods and beverages at a desired eating temperature for extended periods of time.

Phase change materials have also been used to keep clothing at a comfortable temperature. One application requires the use of alkyl hydrocarbons mixed with silicon dry powders contained in plastic film pouches which are placed between layers of clothing. See e.g. Salyer, U.S. Pat. No. 5,211,949 issued May 18, 1993 and assigned to the same assignee as the present invention. The pouches are bulky and only provide a benefit to those areas of the article of clothing in which the pouch is used. The shape of these pouches makes it difficult to secure them throughout a garment. Phase change materials have also been microencapsulated for use in clothing applications. However, the microcapsules do not have the structural integrity to withstand the force exerted on the microcapsule when the encapsulated phase change material is extruded to form fibers. Others have attempted to coat a phase change material onto textile fibers but this application does not permit the use of a sufficient amount of the phase change material to provide effective phase change properties in the article of clothing formed from these coated fibers.

Thus, a need has arisen in the art for a fiber which successfully incorporates a phase change material to provide an article of clothing or bedding having comfortable properties produced by the phase change materials.

SUMMARY OF THE INVENTION

That need is met by the present invention which provides a fiber composition which incorporates a phase change material into the structure of a fiber forming polymer. Fibers formed from the fiber composition can then be incorporated into clothing and bedding. These fiber compositions can store and release heat (or coolness) in sufficient quantity to provide the wearer with comfort for a significant period of time. Fibers formed from these compositions show no oozing of the phase change material when thermocycled and can be modified with an additional component to provide microwave heating capability. In addition, the moldable, fiber forming composition of the present invention, after being formed into fibers, can be repeatedly thermocycled above the melting point of the phase change material without undergoing melt flow, and with little apparent change in volume during melting and freezing.

As stated above, the present invention is directed to a fiber composition comprising a fiber forming polymer and a phase change material integrally incorporated throughout the fiber. By "integrally incorporated," it is meant that the phase change material makes up at least a portion, if not all, of the polymeric structure of the fiber composition itself. "Integrally incorporated" does not include microcapsules containing phase change materials incorporated into fibers or fibers coated with microcapsules containing phase change materials. The phase change material can be incorporated into the fiber as an alternating unit of the polymer, as a repeating unit of the polymer, as the polymer itself or some variation thereof. Preferably, the phase change material chosen to be incorporated in the structure of the fiber will have a melting a temperature between about 15° C. and about 65° C.

One of the phase change materials useful in the present invention is a solidified melt mixture of an alkyl hydrocarbon phase change material, a polyolefin resin, an ethylene copolymer, and silica particles of the type disclosed in parent application Ser. No. 08/468,441. When a microwave heating capability is desired, a microwave absorbing additive can be added as an additional ingredient. The polyolefin resin is preferably an uncrosslinked high density polyethylene; although, a higher melting polypropylene may also be used. The ethylene copolymer is preferably an ethylene-vinyl acetate copolymer containing approximately 10–20% by weight vinyl acetate, but may also be an ethylene-methyl acrylate copolymer, an ethylene-ethyl acrylate copolymer, or equivalent molar copolymer. The silica particles are preferably precipitated silica particles having a surface area of from 50 to 500 square meters per gram and primary particle sizes of from 0.005 to 0.025 microns; although, fumed silicas can also be used. The alkyl hydrocarbon phase change material is preferably a crystalline alkyl hydrocarbon having a heat of fusion of greater than about 30 cal/g. The microwave absorbing additive is preferably a glycerine or a carbon black.

In one embodiment of the melt mix polymer, the preferred weight percentage of each ingredient, based on the total weight of the composite, is about 60% phase change material, about 16–22% polyolefin, about 8–12% ethylene copolymer, and about 8–16% silica particles. A small amount, e.g., 0.1 to 8.0%, of carbon black may be added to render the composite microwavable. When a microwave absorbing additive is used, the preferred weight percentages are about 55% phase change material, about 15–21% polyolefin, about 7–11% ethylene copolymer, about 7–15% silica particles, and about 7.5% microwave absorbing additive.

Another phase change material useful with this invention is a polyethylene oxide polymer. Because polyethylene oxide polymers have a melting/freezing temperature, they are particularly useful in high temperature applications. Polyethylene oxide can be formed into a fiber by itself, incorporated into the structure of a polyester or polyurethane fiber forming polymer, or blended with polyethylene glycol to form a fiber. A useful polyethylene oxide polymer has a molecular weight between about 50,000 m.w.u. and 1,000,000 m.w.u. and preferably between about 100,000 m.w.u. and about 500,000 m.w.u. Most preferably, the polyethylene oxide polymer will have a molecular weight between about 100,000 m.w.u. and about 200,000 m.w.u. Useful polyethylene oxides store about 40 cal/g of thermal energy. Additionally, because of their chemical structure, it is unnecessary to incorporate a microwave absorber into the polymeric structure of polyethylene oxide polymers.

Another useful fiber composition comprises a polyethylene glycol polymer phase change material incorporated into the structure of a polyurethane fiber forming polymer. When a polyethylene glycol polymer is reacted with an isocyanate, the polyethylene glycol maintains its crystalline melting temperature and thermal storage properties. A useful polyethylene glycol polymer will have a molecular weight between about 300 m.w.u. and about 10,000 m.w.u. and preferably about 600 m.w.u. and 2000 m.w.u.

Still another useful fiber composition comprises a polyethylene glycol polymer substituted for at least a portion of the ethylene glycol in a polyethylene terephthalate fiber forming polymer. Polyethylene glycol can be substituted for all or some of the ethylene glycol depending upon the desired strength characteristics of the resultant polymer. Preferably, the resultant polymer fiber will contain between about 10% and about 20% ethylene glycol to provide strength to the resultant polymer. The preferred molecular weights for the polyethylene glycol are the same as those stated above for use with the urethane.

In another embodiment, the fiber may be formed from a polymer blend containing a polyethylene oxide polymer and a polyethylene glycol polymer. In this blend, the polyethylene oxide provides a matrix for the lower melting polyethylene glycol. The mixed polymer may also be blended with a polyurethane or polyethylene terephthalate polymer to form the fiber composition of this invention.

Fibers formed from the fiber compositions of the present invention have the advantage of lower cost, thermoplastic processability, adaptability for forming into fibers, higher apparent density (when compared with phase change material/silica dry powders), microwave heating capability and elimination of oozing (when compared with phase change material/cross-linked HDPE pellets). This combination of properties and performance characteristics makes the fiber compositions of the present invention suitable for a wide variety of textile applications for which fibers formed from previous phase change materials have not been universally adapted.

The above described fiber compositions can be formed into fibers either by melt spinning, solution spinning or dry spinning. Because these compositions can be formed into fibers, they can be used in a non-woven state as loose "fill" material having a combination of thermal storage and insulating properties. The fibers may be used in the form of loose fill (as in polyester pillows) to supply insulation in clothing, quilts, blankets, etc. The fibers may also be incorporated into a fabric to provide a product that absorbs and releases thermal energy to provide a plateau of temperature in the human comfort range for warmth or coolness for a sufficient period of time to be useful, without a prohibitive weight requirement.

Accordingly, it is an object of the present invention to provide a fiber composition comprising a fiber forming polymer which integrally incorporates phase change materials to be used in clothing and bedding. These, and other objects and advantages of the present invention, will become apparent from the following detailed description and the accompanying claims.

DETAILED DESCRIPTION OF THE PREFERRED EMBODIMENTS

The present invention is directed to a fiber composition comprising a fiber forming polymer and a phase change material integrally incorporated throughout the fiber. By "integrally incorporated," it is meant that the phase change material makes up at least a portion, if not all, of the structure of the fiber composition itself. "Integrally incorporated" does not include microcapsules containing phase change materials incorporated into fibers or fibers coated with microcapsules containing phase change materials. The phase change materials of this invention can be incorporated into the fiber forming polymer as an alternating unit of the fiber forming polymer, as a repeating unit of the fiber forming polymer, as the fiber forming polymer itself or some variation thereof. The fiber composition may also include a microwave absorbing additive, such as glycerine or carbon black, to allow the fiber to be heated by microwave energy. Preferably, the phase change material chosen to be incorporated in the structure of the fiber forming polymer will have a melting a temperature between about 15° C. and about 65° C. In a preferred embodiment, the phase change material and the polymer are the same material. In other words, the fiber composition is formed from a phase change material.

The first phase change material which can be used to form the fiber composition of this invention is a composite phase change material which, in its most basic form, is a solidified melt mixture of a polyolefin resin, an ethylene copolymer, silica particles, and an alkyl hydrocarbon phase change material. When it is desired to have a composite that can be heated by microwave energy, a microwave absorbing additive is added.

The polyolefin is preferably a high-density polyethylene (HDPE) having a molecular weight or melt index in the range of 0.5 to 5 decigrams/minute. Examples of such materials are Marlex 6006 and Alathon 6210 from Phillips Chemical Co., Bartlesville, Okla. and Occidental Chemical Company, Niagara Falls, N.Y., respectively. The HDPE, when it cools from the melt, establishes a matrix within which the lower melting phase change material can melt and freeze without changing the volume of the composite significantly. Thus, the melting temperature must be well above the highest temperature that will be encountered in use. For this reason, commercial low-density polyethylenes would be less desirable though not without some utility. It also is possible to substitute a higher melting polypropylene for HDPE, which may be a decided advantage in some applications, although, processing is more difficult.

The ethylene copolymer serves a compatibilizing bridge between the very low molecular weight phase change material and the high molecular weight, high melting HDPE. A series of ethylene-vinyl acetate (EVA) copolymers containing from 5 to 28% wt. of vinyl acetate were tested for compatibility and oozing reduction. As a result, copolymers in the range of 10–20% wt. of vinyl acetate are preferred and those containing about 15–17% wt. vinyl acetate most preferred. Comparable compatibility and non-oozing could be obtained in melt-mixed blends wherein equivalent quantities of ethylene/methyl acrylate (EMA), or ethylene/ethyl acrylate (EEMA) are substituted for EVA.

The silica in the composite is added to tie up the low-melting phase change material in a stable gel to further prevent oozing. The amount of silica is, therefore, directly related to the amount of the phase change material and should be about 7–16% of composite weight. One preferred silica is ABS precipitated silica from PPG Industries Inc., of Pittsburgh, Pa., which is a normal, hydrophilic silica with a surface area of 150 m$^2$/gram and a particle size of about 0.022 microns. However, other precipitated silica having a comparable particle size and surface area would work equally as well. Fumed silicas of comparable or smaller particle size and equal or greater surface area should also be satisfactory, but are much more expensive. Another preferred silica is a precipitated or fumed silica which has been surface treated with silane coupling agents or silicone resins to provide a hydrophobic surface which renders the silica unaffected by water or relatively high humidity.

Substantially any phase change material can be used which is compatible with the polyolefin. In most cases, compatible phase change materials will be characterized by a long alkyl hydrocarbon chain within their molecular structure. Preferred phase change materials are crystalline organic compounds such as crystalline alkyl hydrocarbons, crystalline fatty acids, crystalline fatty acid esters, crystalline 1-olefins, crystalline 1-halides, crystalline primary alcohols, crystalline alicyclic hydrocarbons, and crystalline aromatic hydrocarbons which melt and freeze within the desired thermal transfer temperature range of about 0° C. to about 60° C.

A number of commercially available paraffins are useful as phase change materials in the present invention including Shellwax 100 (MP 42°–44° C.), Shellwax 120 (MP 44°–47° C.), Shellwax 200 (MP 52°–55° C.), Shellwax 300 (MP 60°–65° C.) all of which are products of Shell Oil Co., Houston, Tex.; Union SR-143 (MP about 61° C.) a product of Union Oil Co., Los Angeles, Calif.; Witco 128 (MP about 53° C.), Witco LLN, Witco 45A, Witco K-18, Witco K-19, Witco K-61, Witco K-51, and Witco 85010-1 all products of Witco Corp., New York, N.Y.; and Aristowax 143 (MP 34°–61° C.) from Unocal Corp., Los Angeles, Calif. These paraffins have heats of fusion greater than 30 cal/g and, by comparison to other phase change materials, are inexpensive. Some of them cost as little as $0.15 (U.S.) per pound when purchased in a tank car quantity.

For the melt mix composition, the thermal storage depends upon the hydrocarbon component. If a "pure" hydrocarbon is used the thermal storage ability is 60 cal/g, but if a impure hydrocarbon is used, the thermal storage drops to 40–45 cal per gram. The term "pure" is used herein to mean that the carbon chain length is comprised of molecules of essentially single carbon chain length and does not have any branches. Thus, a 100% pure hydrocarbon would be a straight chain hydrocarbon, such as $C_{18}$, having no branches. If the concentration of the hydrocarbon is 60% of the melt mix composition, then the energy storage will be equivalent to 60% of the thermal storage ability of the hydrocarbon component. Useful hydrocarbons will have a chain length of $C_{14}$ to $C_{44}$. More preferably the hydrocarbons will have a chain length of $C_{16}$ to $C_{40}$ and most preferably $C_{18}$ to $C_{24}$. $C_{18}$ is the most preferable hydrocarbon for textile uses because it has a melting point near room temperature. A useful hydrocarbon for this invention is K18 available from Witco Chemical Company of Bradford, Pa. K18 is a mixture of hydrocarbons having chain lengths between $C_{16}$ and $C_{20}$.

Glycerine has been found to be an effective microwave absorbing additive at about 10% wt. in phase change material/silica dry powders for hot medical therapy and warm clothing applications. In the current melt-mix composite, a somewhat lower concentration in the amount of about 7–8% wt. appears to heat effectively in about 4 minutes to a temperature well above the melting point of the phase change material component.

A somewhat more effective alternate to the glycerine as a microwave heating additive is the special grade of Cabot Conducting Carbon Black XC-72-R from Cabot Corp., Boston, Mass. This black will heat effectively at lower concentrations than glycerine. A further advantage of the carbon black as a microwave heating additive is that since it is not a liquid that has to be taken up by the silica (gelled), a formulation with somewhat higher concentration of phase change material could be used. The major disadvantage of carbon black is that even in low concentrations the color of the composite will be changed to a dark gray to black depending on the concentration of the carbon black.

When the melt mix polymer is employed without a microwave absorbing additive or when carbon black is used as that additive in small amounts (i.e., about 0.1–8 weight percent), the melt mix polymer will preferably contain about 60% phase change material, about 16–22% polyolefin, about 8–12% ethylene copolymer and about 8–16% silica particles, all based on the total weight of the melt mix polymer. When glycerine is added as a microwave absorbing additive, the preferred percentages are about 55% phase change material, about 15–21% polyolefin, about 7–11% ethylene copolymer, about 7–15% silica particles, and about 7–8% microwave absorbing additive.

A second phase change material useful to form the fiber composition of this invention is a polyethylene oxide polymer. Useful polyethylene oxides are chosen for an optimal combination of strength and melt processability. Because polyethylene oxides have a melting and freezing temperatures of approximately 60° C. to 65° C., they are particularly useful in high temperature textile applications.

The strength of polyethylene oxide polymers increases with increasing molecular weight while the melt processability decreases with increasing molecular weight. The strength of such a polymer increases rapidly up to a weight of 100,000 m.w.u. but then plateaus as the molecular weight exceeds 1,000,000 m.w.u. In regard to melt processability, molecular weights less than 100,000 m.w.u. are extremely easy to process. Thus, a useful polyethylene oxide polymer has a molecular weight between about 50,000 m.w.u. and about 1,000,000 m.w.u. Preferably, the polyethylene oxide will have a molecular weight of about 75,000 m.w.u. to about 500,000 m.w.u. and most preferably about 100,000 m.w.u. to about 200,000 m.w.u. Useful polyethylene oxides store about 40 cal/g of thermal energy. Additionally, because of the polar oxygen atom in the polymer chain, polyethylene oxide polymers inherently absorb microwave energy and, thus, the addition of a separate microwave absorber is unnecessary.

The polyethylene oxide polymer can be used by itself to form the fiber composition or it may be integrally incorporated into the structure of a urethane fiber forming polymer or a polyester fiber forming polymer. Because each polyethylene oxide polymer molecule has two terminal hydroxyl groups, polyethylene oxide polymer molecules can be reacted with polyfunctional isocyanates to produce urethane polymers which retain the crystalline melting temperature and thermal storage characteristics of the polyethylene oxide. Crosslinking of the polyethylene oxides with polyfunctional isocyanates does not exhibit a melt flow above the crystalline melting point of the polyethylene oxide component. If the polyethylene oxide is reacted with a polyfunctional isocyanate, the polyethylene oxide will preferably constitute about 60% to about 70% of the resultant polymer.

Another useful fiber composition can be formed by integrally incorporating a polyethylene oxide polymer into polyethylene terephthalate fiber forming polymer by substituting polyethylene oxide for all or part of the ethylene glycol. The properties of the useful polyethylene oxide are determined by the desired temperature for the heat storage material. The highest thermal storage is obtained by replacing all of the ethylene glycol with polyethylene oxide. However, to obtain better strength properties, it may be desirable to incorporate a minor percentage (about 10–30%) of ethylene glycol into the molecular structure of the resultant polymer. In a preferred embodiment, polyethylene oxide will constitute about 60% to about 70% of the resultant polymer.

Another fiber composition useful with this invention can be formed from by integrally incorporating a polyethylene glycol phase change material into the molecular structure of a polyurethane fiber forming polymer. Polyethylene glycols (PEG) are a series of lower molecular weight analogues to polyethylene oxides. The melting temperature of PEGs increases with increasing molecular weight. The melting point of a polyethylene glycol polymer with a molecular weight of 300 m.w.u. is approximately −10° C. PEGs with a molecular weight of greater than 8,000 m.w.u. have a melting point which levels out at about 60° C. Thus, a wide range of useful PEGs can be chosen dependent upon the desired temperature range in which the phase change material will be used. The thermal energy storage of PEGs also increases slightly with increasing molecular weight but levels out at approximately 40 calories per gram at molecular weights above 5,000 m.w.u. The thermal energy storage of PEGs useful with invention averages about 35 cal/g.

Because each polyethylene glycol polymer molecule has two terminal hydroxyl groups, PEGs can be reacted with polyfunctional isocyanates to produce urethane polymers which retain the crystalline melting temperature and thermal storage characteristics of the PEG. The crosslinking of the PEGs with polyfunctional isocyanates does not exhibit a melt flow above the crystalline melting point of the PEG component. If the PEG is reacted with a polyfunctional isocyanate, the PEG will preferably constitute about 60% to about 70% of the resultant polymer.

Still another useful fiber composition can be formed by integrally incorporating a PEG polymer into polyethylene terephthalate fiber forming polymer by substituting PEG for all or part of the ethylene glycol. Again, the properties of the useful PEG are determined by the desired temperature for the heat storage material. The highest thermal storage is obtained by replacing all of the ethylene glycol with PEG. However, to obtain better strength properties, it may be desirable to incorporate a minor percentage (about 10–30%) of ethylene glycol into the molecular structure. In a preferred embodiment, the PEG polymer will constitute about 60% to about 70% of the resultant fiber composition. The polyester fiber of this embodiment is particularly desirable because it has a higher strength and modulus than the PEG incorporated into the polyurethane.

The PEGs are chosen on the basis of their chain length which dictates the melting and freezing point of the resultant phase change material. They preferably will have a melting/freezing point between about 15° C. and about 40° C. For any of the embodiments employing a PEG polymer, the PEG polymer will have a molecular weight between about 300 m.w.u. to about 10,000 m.w.u. and preferably between about 350 m.w.u. to about 2,000 m.w.u. Most preferably, PEG polymers with molecular weights between about 400 m.w.u. and about 600 m.w.u. are used in clothing and bedding applications because they have melting temperatures between about 20° C. and about 25° C.

PEG polymers and polyethylene oxide polymers can be blended together to provide a polymer blend in which the polyethylene oxide is selected to provide a matrix for the PEG. The resulting polymer blend will have a structure such that the PEG can be formed into a fiber. Without the addition of the polyethylene oxide, PEG is not viscous enough to be formed into a fiber. The ratio of PEG to polyethylene oxide in the mixed polymer ranges from about 80–20 to about 60–40. The thermal storage capacity of the polymer blend depends upon the ratio of the components in the blend. In the blend, silica can advantageously be used to increase the viscosity of the blend and impart a gel-like structure to those blends having low viscosity. The silica will typically be present in an amount of up to about 23 weight percent of the weight of PEG in the blend. Useful silicas are the same as those disclosed above.

The polymer blend can be used alone without an additional fiber forming polymer to form the fiber composition of this invention. In another embodiment, the polymer blend can itself be blended with a polyethylene terephthalate fiber forming polymer or urethane fiber forming polymer and formed into a fiber composition having the characteristics of the respective functional groups of those polymers.

Because polyethylene glycol and polyethylene oxide both have terminal hydroxyl groups, they have a tendency to be hydrophilic in their end regions. The hydrophilic nature of these molecules decreases with molecular size as the terminal hydroxyl groups become separated. In most applications in which these molecules are used, the hydrophilic nature of the terminal regions of these molecules does not present a problem for their use, particularly, if they are used on the interior of a garment. However, there are situations in which water resistance is desirable. In those instances, both polyethylene glycol and polyethylene oxide can be endcapped to decrease their water resistance. Particularly, they can be esterified or etherified which substantially reduces the hydrophilic nature of the fibers formed from those molecules. These materials may also be reacted with a monofunctional isocyanate to form an urethane to reduce water susceptibility.

The fiber compositions of the present invention can be spun into textile fibers by melt spinning, solution spinning or dry spinning. The melt mix, polyurethane and polyester are preferably spun into textile fibers by melt spinning. The polyethylene oxide phase change materials can be spun into fibers either by solution spinning or dry spinning and are preferably spun by means of solution spinning.

To melt spin the fiber compositions, the fiber composition is heated to a temperature above its crystalline melting point and below its thermal decomposition temperature. At this point, the polymer is in a condition in which it can be melt extruded. The melted material is then spun, i.e., extruded, into the air forming the fibers.

Because of their high molecular weight, the fiber compositions containing polyethylene oxide phase change materials are preferably spun by either solution or dry spinning, although polyethylene oxide polymers with molecular weights below 400,000 m.w.u. can also be melt spun. The fiber composition containing the polyethylene oxide phase change materials is preferably dissolved in a polar solvent such as dimethyl formamide, dimethyl acetamide or a mixture of both. Water may also be used as the solvent for the solution or dry spinning of fiber compositions containing polyethylene oxide. The fiber composition is dissolved in the solvent and then spun into a coagulating bath in which the fibers are formed. If the fiber composition containing the polyethylene oxide phase change materials is solution spun, then the mixture preferably comprises about 15% to about 35% of the fiber composition and about 65% to about 85% of the solvent. Most preferably, the concentration of the fiber composition in the solution will be between about 20% and about 30%. For dry spinning, the fiber composition is dissolved in the polar solvent and spun into the air. The excess solvent is then evaporated into the atmosphere.

Once the fiber compositions of this invention have been formulated into fibers, they can then be incorporated into an article of clothing. The fibers formed from the fiber compositions of this invention can be incorporated into a variety of articles such as articles of clothing, e.g., socks, underwear, pants, dresses, shirts, gloves, mittens, hats, and the like or bedding articles, e.g., sheets, blankets, comforters, quilts and the like. The fibers can be used in woven and nonwoven applications. As used herein, the term "nonwoven" means that the fibers have not been systematically woven or formed into a fabric. This definition does not preclude the fibers being formed into a felt or felt-like material. The fibers can be used as loose "fill" material, formed into a batt, woven into an inner liner or woven as an outer shell of a garment.

One nonwoven application for these fibers comprises using the fibers as a loose fill material. In this application, the fibers are placed between two layers of a garment to provide a layer of insulation in that garment. To prevent movement of the fibers in the garment, the two layers between which the fibers are placed may be joined together. Preferably, if the fibers are used as a loose fill material, they will be placed between an inside layer of the garment and an outside layer of the garment. Fibers formed from the fiber composition containing polyethylene oxide polymer and formed by solution spinning are particularly useful as fill material because the solution spinning process produces fibers which may not be smooth enough for external applications.

In another nonwoven application, the fibers can be formed into a batt and then inserted between two layers of the garment. When used in this manner, the batt may also be placed between two layers of the garment which are joined together to prevent movement of the batt within the garment. As described above for the loose fill material, the batt is preferably positioned between an inner layer of the garment and an outer layer of the garment.

The fibers may also be formed into longer fibers and woven into a fabric. The fibers may be loosely woven into a fabric or spun into longer fibers. If the fibers are spun into longer fibers, they can then be manufactured into threads which can be also be used to make a fabric. The fabric woven from the fibers formed from the fiber compositions of this invention can be either woven into an inner liner of a garment or into an outer layer of a garment. If woven into an outer layer of a garment, fibers including hydrophilic moieties, such as polyethylene oxide or PEG, can be end-capped by esterification or etherification to prevent those polymers from absorbing water.

The fibers formed from the fiber compositions of this invention can also, alone or in combination with other textile fiber materials, be woven into a fabric and used directly to supply both wear and thermal comfort features. The fibers can be woven or knitted into fabrics that can be used "neat" or in combination with other fibers (e.g. PET or Nylon) to form textile fabrics. The fibers can also be woven in combination with nonphase change fibers to form a thread or fabric having incorporated phase change characteristics. The fibers of this invention could also be incorporated into a polymer used to make garments to form a single polymer fiber having alternating or repeating units of phase change and non-phase change materials.

Of the above embodiments, the fiber compositions will have preferred melting and freezing temperatures of about 15° C. to about 65° C. Most preferably, when not being used in high temperature applications, the polymers will have melting and freezing temperatures of about 18° C. to about 40° C. This last temperature range covers the ambient temperatures at which the human body is most comfortable.

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. An article of clothing formed, at least in part, from a melt mix polymer fiber, said melt mix polymer comprising a mixture by weight percent of about 15–22% of a polyolefin selected from the group consisting of high density polyethylene, low density polyethylene, and a higher melting polypropylene, about 7–12% of an ethylene-vinyl acetate copolymer, about 7–16% of silica particles, and about 55–60% of a long alkyl hydrocarbon chain phase change material.

2. The article of claim 1 wherein the phase change material has a melting temperature between about 15° C. and about 65° C.

3. The article of claim 1 wherein the melt mix polymer comprises about 60% phase change material, about 16–22% polyolefin, about 8–12% ethylene-vinyl acetate copolymer, and about 8–16% silica particles.

4. The article of claim 3 wherein the melt mix polymer comprises 55% phase change material, about 15–21% polyolefin, about 7–11% ethylene-vinyl acetate copolymer, about 7–15% silica particles and about 7.5% microwave absorbing additive.

5. The article of claim 1 wherein the melt mix polymer fiber is formed into a fiber by melt spinning.

* * * * *